United States Patent [19]
Lord

[11] Patent Number: 5,871,647
[45] Date of Patent: Feb. 16, 1999

[54] WASTEWATER TREATMENT UNIT AND METHOD FOR TREATING WASTEWATER

[76] Inventor: Yves Lord, 3031, William-Stuart, Québec, Ste-Foy, Canada, G1W 1V6

[21] Appl. No.: 803,240

[22] Filed: Feb. 20, 1997

[51] Int. Cl.$^6$ .................................................... C02F 3/04
[52] U.S. Cl. .................. 210/615; 210/622; 210/629; 210/802; 210/804; 210/805; 210/806; 210/109; 210/150; 210/151; 210/195.1; 210/196; 210/197; 210/202; 210/209; 210/220; 210/221.2; 210/248; 210/255; 210/258; 210/262; 210/320; 210/456; 210/521; 210/522; 210/532.1; 210/903
[58] Field of Search ................................ 210/601, 615, 210/616, 617, 620, 621, 622, 629, 739, 744, 800, 802, 804, 805, 806, 109, 150, 151, 195.1, 196, 197, 202, 203, 209, 220, 221.2, 248, 255, 258, 259, 262, 305, 320, 456, 521, 522, 532.1, 903, 926

[56] References Cited

U.S. PATENT DOCUMENTS

| | | | |
|---|---|---|---|
| 3,666,106 | 5/1972 | Green | 210/201 |
| 3,701,426 | 10/1972 | Wetzel | 210/152 |
| 3,767,051 | 10/1973 | Thompson | 210/197 |
| 3,933,641 | 1/1976 | Hadden et al. | 210/205 |
| 3,966,604 | 6/1976 | Diggs | 210/104 |
| 3,997,444 | 12/1976 | McGivern . | |
| 4,100,073 | 7/1978 | Hopcroft . | |
| 4,104,167 | 8/1978 | Besik . | |
| 4,501,665 | 2/1985 | Wilhemson | 210/630 |
| 4,505,813 | 3/1985 | Graves | 210/86 |
| 4,608,157 | 8/1986 | Graves | 210/86 |
| 4,663,044 | 5/1987 | Goronszy | 210/610 |
| 4,664,795 | 5/1987 | Stegall et al. | 210/202 |
| 4,933,076 | 6/1990 | Oshima et al. | 210/151 |
| 4,992,165 | 2/1991 | Jensen | 210/124 |
| 5,108,609 | 4/1992 | Burt | 210/532.1 |
| 5,162,083 | 11/1992 | Forbes et al. | 210/199 |
| 5,206,168 | 4/1993 | Boyle | 435/262 |
| 5,207,899 | 5/1993 | Boyle | 210/138 |
| 5,268,094 | 12/1993 | Long | 210/139 |
| 5,409,604 | 4/1995 | Graves | 210/198.1 |
| 5,413,706 | 5/1995 | Graves | 210/110 |
| 5,451,316 | 9/1995 | Allen | 210/195.4 |

FOREIGN PATENT DOCUMENTS

| | | |
|---|---|---|
| 0962583 | 12/1949 | France . |
| 2611197 | 8/1988 | France . |
| 0294682 | 10/1991 | Germany . |
| 60-216891 | 10/1985 | Japan . |
| 7900528 | 7/1980 | Netherlands . |
| 1662947 | 7/1991 | U.S.S.R. . |
| 2239237 | 6/1991 | United Kingdom . |
| 9000527 | 1/1990 | WIPO . |

Primary Examiner—Robert Popovics
Attorney, Agent, or Firm—Collard & Roe, P.C.

[57] ABSTRACT

The wastewater treatment unit is operable under high intermittent flow rate variations. It comprises a first clarifier in which is carried out a gravitational settling of solids and a second clarifier comprising a network of parallel plates inclined with respect to the vertical and a portion defining a collecting pit. Each plate has an upper edge positioned at a height lower than the filling level of the first clarifier to define an overflow giving access to the collecting pit. The network of plates allows to carry out a further settling of solids to create a counterflow of settled matter toward the first clarifier and a flow of clarified wastewater falling in the collecting pit. A filtering chamber is positioned above the first clarifier and comprises a filtering media supporting a biomass for digesting the organic content of the wastewater coming from the second clarifier. The filtering chamber has an inlet in fluid communication with one outlet of the second clarifier, and an outlet in fluid communication with an inlet of the first clarifier for recirculation purposes. The unit also comprises a third clarifier for further treating wastewater coming from an other outlet of the second clarifier. An outflow controller located at the outlet of the third clarifier and an air lift pump for conveying the wastewater from the second clarifier into the filtering chamber and for providing oxygen into the unit are also provided. The wastewater treatment unit is capable of handling efficaciously effluents from different sources including those from family homes.

13 Claims, 6 Drawing Sheets

WASTEWATER TREATMENT UNIT AND METHOD FOR TREATING WASTEWATER

FIELD OF THE INVENTION

The present invention relates to a new wastewater treatment unit. The invention also relates to a new method for treating wastewater when using said new unit.

BACKGROUND

Treatment of wastewater, especially wastewater containing organic matter, is usually carried out using biological processes involving contact with a biomass (living microorganisms) maintained in suspension or fixed on a supporting media. These processes are usually oriented toward treatment of wastewater from large cities and/or industries. They are conceived to work with minimum flows and loads corresponding to more than one hundred persons. Some people have been trying to adapt it to smaller installations without too much success.

Prior art methods involving the use of a suspended biomass are mainly based on a substrate/biomass ratio which is affected by flow and load variations. These methods aim at reaching an equilibrium state and require frequent adjustments to maintain a stable efficiency. In general, these processes consist in mixing and aerating the microorganisms and the incoming wastewater for a certain period of time before transferring the wastewater to a secondary clarifier for the solid-liquid separation. Furthermore, in order to keep the substrate/biomass ratio as constant as possible, additional equipments (pumps, valves, piping, etc.) are required to transfer the biomass from the secondary clarifier to the biological reactor. Also, aeration control within a certain range is a critical factor. Flow variations also have negative effects on the standard secondary clarifier by varying the water upflow velocity that could carry suspended solids over the effluent weir. Apparatuses and methods involving a suspended biomass are described by way of examples in U.S. Pat. Nos. 3,666,106; 3,767,051; 3,966,604; 44,104,167; 4,608,157; 4,663,044; 4,664,795; 5,162,093; 5,268,094 and German Patent No. 0,294,682.

Prior art methods involving the use of a fixed biomass can be performed in different ways. One of these ways involves the use of a coarse media (trickling filter) with a fixed or moving water distribution system, with or without water recirculation (additional pumps or not). According to another one of these methods, fine particles media (biofiltration, peat moss filtration, etc.) may be used with a fixed or moving water distribution system and, furthermore, with a filter backwash system. According to another one of these methods, moving media (biodisks) can be used either partially or fully submerged in relatively stagnant water or not. According to this last method, a flow and/or load variation, because of the constant metabolism of the microorganisms and the impossibility to vary their quantity rapidly in the unit, results in an efficiency drop. The only possible intervention is the modification of the recirculation rate when this option is available. A human intervention is then required to analyze pollutant parameters and make the necessary adjustments but this cannot logically be done for daily variations.

When the preceding treatment processes are used for small flows and weak loads, because of relatively high variations, the main adjustments (air, mixing, recirculation etc.) must be made under average conditions. However, the unit will never operate exactly at average flow and effluent quality variations that could occur could be unacceptable. Complex and expensive control systems have been used to maintain efficiency as stable as possible. This is not economically justifiable for small units.

In the majority of cases belonging to the prior art, clarifiers are used before and after the biological reactor to remove all settleable solids before entering the reactor or before discharging into the environment. These units are designed to operate with continuous flows and are very sensitive to flow variations. Indeed, changes in the water velocity induce turbulence that may cause the light settled solids to return in suspension. The total unit efficiency relies greatly on this ability to retain solids.

In the case of small flows, certain elements (pipe diameter, pumps, etc.) are overdesigned to minimize clogging problems. This can cause low velocity flow in areas where solids settling or high flows in other places would be undesirable.

To avoid prior art disadvantages related to mechanized treatment units, it has been already suggested to use aerated or non-aerated lagoons for medium flows and weak to medium loads. This type of technology does not allow any control since efficiency depends solely on the temperature and the hydraulic retention time which is linked to the basins volume and inlet flow. This alternative occupies a relatively important land area which shall be as horizontal as possible, with exposed water surfaces that could be undesirable near dwellings. Hydraulic retention time is measured in days. A minimal distance should be kept to the nearest house to avoid odor detection for particular climatic conditions. For smaller flows, septic tanks followed by buried weeping tile fields have been used and continue to be used mainly in rural areas. Weeping tile fields are subject to clogging especially when built in non-permeable soils. It requires a relatively big area and shall be built at a minimum distance from any drinking water source. After construction, the tile field is not readily accessible for inspection and/or modifications.

Also known in prior art, there is the trickle filtration apparatus described in UK patent application No. 2,239,237-A. This apparatus is designed to be sunk into the ground, leaving only an upper portion of the apparatus above ground level. It comprises a primary settlement tank side-by-side with a secondary settlement tank. A pump in a chamber pumps supernatant from tank which has entered chamber through inlet continuously to the top of filter media in a filter tank above the first mentioned two tanks. Supernatant trickles down the filter media and is collected at the bottom to flow through a conduit back to the pump chamber. Inflow of sewage into the primary tank results in supernatant spilling out of the conduit at a break point into the secondary settlement tank and in treated liquor spilling out of the latter through an outlet. Oxygenation of the biomass on the filter media is by natural air convection. A drawback with this type of apparatus is that, because of its design, the content of the primary tank rapidly passes in an anaerobic state. This is due to the fact that there is no recirculation of water in this primary tank. As well known in the art, anaerobic degradation is slow and causes formation of foul gases.

In short, actual wastewater treatment units are either complicated to operate, sensitive to hydraulic shocks or inefficient. They are generally of a large size and have to be operated by skilled workmen.

Therefore, there is a very strong need for a wastewater treatment unit, especially a wastewater treatment unit for wastewater having an organic content, capable of handling efficaciously effluents from different sources including those from single family homes, and remaining operable even under high intermittent flow rate variations without constant human interventions.

SUMMARY OF THE INVENTION

The present invention allows the fulfilment of the aforesaid needs.

Also, the invention shows characteristics allowing an organic matter degradation to be performed without requiring too much mechanical devices so that human intervention for maintenance and operation are reduced to a minimum. Advantageously, according to a particularly preferred aspect of the invention, moving parts may be completely eliminated from the wastewater treatment unit.

Also, the wastewater treatment unit according to the invention can operate adequately despite important instantaneous inlet flow and load variations including those related to the use of household sanitary units. A wastewater treatment unit sized for a single family home represents the most critical possible case.

The invention also relates to a method based on the use of the aforesaid new wastewater treatment unit.

The invention relates to an organic wastewater treatment unit using a combination of a physical process such as static settling and a biological process advantageously comprising a fixed biomass continuously sprayed with the water to be treated.

The invention also relates to a wastewater treatment unit using the same clarifiers to remove the primary and secondary solids simultaneously, thus allowing a better contact between the incoming organic matter and the microorganisms in an oxygenated environment and consequently a faster digestion of the settled solids.

The invention also relates to the use of three clarifiers in series to reduce to a minimum the solids in suspension in the treated water before final discharge.

The invention also relates to a wastewater treatment unit which, thanks to its flow control device, is built to allow only a maximum increase of flow through a plate clarifier of approximately 25% of the instantaneous flow going through at all time and only the equivalent of approximately 10% instantaneous incoming flow transferred to the final clarifier.

According to a preferred embodiment, the invention also relates to a wastewater treatment unit where an air lift pump may be removed for maintenance without having to dismantle the pump nor having to empty the reservoir in which the pump is installed.

Also according to a preferred embodiment, an object of the invention is to optimize the use of the air coming from a pump by ventilating with such air the filtering media supporting a biomass.

Also according to a preferred embodiment, the invention relates to a wastewater treatment unit further comprising a recirculation pump, the filtering media provided with a biomass and all accessories for distribution and collection of the water to be treated and which could be installed on an existing clarifier(s).

Generally, wastewater treatment units require a recirculation flow of wastewater on the biomass of about one time the inlet flow. The wastewater treatment unit according to the invention may have a recirculation flow of wastewater on the biomass greater than one, for example from 10 to 45, preferably about 40, taking advantage of the zero flow influent period to lower the total volume of water in the unit to discharge concentration standards.

More particularly, the invention relates to a wastewater treatment unit which is operable under high intermittent flow rate variations and comprising, in combination, the following elements.

A first clarifier is provided, comprising a first reservoir to be filled with wastewater up to a filling level and in which is carried out a gravitational settling of solids and/or heavy portions of said wastewater. This first reservoir has an inlet and an outlet. The inlet of the first reservoir advantageously defines the inlet of the unit. The outlet is positioned under the filling level.

A second clarifier is provided, comprising a second reservoir having an inlet, a first outlet, a second outlet, a first portion comprising a network of parallel plates inclined with respect to the vertical and a second portion defining a collecting pit. Each plate has an upper edge positioned at a height lower than the filling level of the first reservoir to define an overflow giving access to the collecting pit. The network of plates allows to carry out a further settling of solids and/or heavy portions of wastewater when this latter flows therethrough, to create a counterflow of settled matter toward the first reservoir and to create a flow of wastewater falling in the collecting pit. The inlet of the second reservoir is in fluid communication with the outlet of the first reservoir. The first outlet of the second clarifier is positioned in a lower portion of the collecting pit, preferably underneath a horizontal baffle centered on the opening. The second outlet of the second reservoir is positioned at the filling level.

A filtering means positioned above the filling level of the first reservoir is provided. The filtering means comprises a third reservoir having an inlet, an outlet and a filtering media provided with a biomass for digesting an organic content of the wastewater without substantially retaining suspended solids and/or heavy portions of the wastewater coming from the second clarifier. The inlet of the third reservoir is in fluid communication with the outlet of the second reservoir. The outlet of the third reservoir is in fluid communication with the inlet of the first reservoir for recirculation purposes.

A conveying means allowing to convey the wastewater coming from the outlet of the second reservoir to the inlet of the third reservoir is also provided.

A third clarifier is provided, comprising a fourth reservoir in which is carried out a further gravitational settling of solids and/or heavy portions still contained in the wastewater and coming from the second reservoir. This fourth reservoir has an inlet and an outlet, the inlet being in fluid communication with the second outlet of the second reservoir. The outlet of the fourth reservoir advantageously defines the outlet of the unit and is positioned to have a lower portion thereof at the filling level of the first reservoir.

The wastewater treatment unit further comprises an outflow controller for controlling an outflow of water from the unit through the outlet of the fourth reservoir.

Preferably, the unit is further provided with means for introducing an oxygen containing gas (e.g. air) in the wastewater coming from the second clarifier and before contact with the biomass.

The invention also relates to a method for treating wastewater with a treatment unit according to the invention. More particularly, the following steps are carried out when the first reservoir and second reservoir are first filled with wastewater above the height of the upper edge of plates of the network of plates.

Wastewater is introduced in the first reservoir through the inlet of the first reservoir and subjected to a gravitational settling of solids and/or heavy portions of the wastewater.

Wastewater is moved in the second reservoir, via the outlet of the first reservoir and the inlet of the second reservoir, to generate a further settling of solids and/or heavy portions of the wastewater, to create a counterflow of settled matter toward the first reservoir and to create a flow of wastewater falling in the collecting pit.

Wastewater contained in the collecting pit is then enriched with the oxygen containing gas means and conveyed by the conveying means, via the first outlet of the second reservoir and the inlet of the third reservoir, and passed through the filtering media provided with a biomass to carry out a biological digestion of an organic content of said wastewater without substantially retaining solids and/or heavy portions contained in said wastewater, and an effluent flow is drained out via the outlet of the third reservoir and recirculated to the first reservoir via the inlet of said first reservoir.

It has to be understood that when a portion of the wastewater flowing in the second reservoir rises above the filling level, this portion is evacuated toward the fourth reservoir through the second outlet of the second reservoir and the inlet of the fourth reservoir.

Also, when a portion of the wastewater filling the fourth reservoir rises above the filling level, this portion is drained out from the wastewater treatment unit.

Preferably, it is to be noted that a wastewater treatment unit according to the invention is advantageously using a combination of physical and biological processes to remove both particulate and soluble organic matter from the wastewater. Advantageously, the biological digestion of the treatment is performed in a filtering media such as a trickling filter. Wastewater may be first passed through clarifiers to remove settleable solids and then placed in contact with a biomass fixed on the surface of a filtering media so that soluble organics are transformed into living cells. This biological mass separates periodically from the media and is washed away by water to the inlet end of the primary clarifier to be settled together with incoming solids from the raw sewage. The total volume of water of the first two clarifiers is recirculated to the biological reactor for a great number of cycles, higher than what would normally be required to remove the organic matter in order to meet the effluent discharge standards.

The third clarifier is used as a polishing clarifier to catch solids that would have been carried over. It is designed so that short-circuiting can be avoided as much as possible. It is also designed to minimize the negative effects of upflow approach velocity by increasing it gradually as it reaches the outlet. Outlet flow is controlled to avoid excessive turbulence and to allow retention of wastewater in the unit during peak inlet flow incidence.

Preferably, the water flow to the biological reactor is constant and independent of the variable inlet flow. Recirculation continues even if there is no new wastewater entering the unit. This has beneficial effects by maintaining low pollutant concentrations in the whole volume of the unit, thereby acting as a buffer diluting incoming wastewater and avoiding discharge of highly concentrated waste to the environment. A second benefit is that it keeps the dissolved oxygen concentration high in the clarifiers, thus favoring microbial activity in the biomass (which has the appearance of settled sludge).

Preferably, the filtering media is located higher than the clarifier(s), so that only an intermediary pumping operation is required to bring a constant flow of oxygenated water to the bio-reactor (i.e. filtering media with biomass). This constant flow to the reactor would then return by gravity to the clarifier, thereby reducing the importance of rapid inlet flow variations that could cause turbulence and thus influence the efficiency.

According to a preferred embodiment, pumping may be performed with at least one air lift pump. Such a pump shows the advantage of dissolving oxygen from the air in the wastewater while pumping the latter. This oxygen helps the microorganisms to transform organic matter. Oxygen from excess air coming out of the air lift pump will be reused to aerate the trickling filter compartment in order to transfer additional oxygen. This type of pumping facility also offers the advantage of housing elements such as pipes, elbows, etc. of bigger sizes to thus reduce the risk of clogging without affecting the operation efficiency. Independently of the choice of the pump(s) to be used, the capacity of the device will be selected to fit with the rate of recirculation dictated by the organic load.

Preferably, the flow rate of the treated wastewater will be regulated in order to reduce as much as possible the effect of incoming flow variations, which are relatively more important in smaller treatment units. In order to eliminate moving parts inside the unit and keeping in mind the clogging problems, this control should take place at the outlet end of the unit where solids, if present, should be of a smaller size. This control may be achieved by forcing the flow through an opening in a thin plate. This device will cause the water to rise in the first, second and fourth reservoirs. The outflow from the unit is a function of the square root of the height of the water stored in the unit which is inversely proportional to the horizontal surface area of the unit.

For this type of invention, the filtering media which supports the biomass could be made of a one piece designed with channels from top to bottom and shaped to give a maximum surface for the biomass to get hooked to it, leaving sufficient free passages for water and debris evacuation. This filtering media may also be made of smaller shapes or crushed stones having a uniform size, placed in bulk in the third reservoir.

For this type of invention, the filtering media supporting the biomass could be made of stones, concrete blocks, plastic, or any other material that would resist chemical and/or physical effects from the treated liquid. This material shall also have surfaces rugged enough for the biomass to get hooked to it. The total volume of media is determined in relation to the organic load to be treated and the quantity of biomass that can be fixed to it.

Preferably, the water distribution system above the media shall be designed to spread the flow as evenly as possible to avoid overloading some sections of the media and underfeeding others. Preferably also, this system should be made of fixed perforated plates and/or pipes shaped to prevent clogging and with surfaces smooth enough to prevent biomass formation and fixing.

Depending on how air is introduced into the system, it is advantageous to direct it as evenly as possible through the filtering media. To do that, the inlet and the outlet of the unit are preferably located on opposite sides of the media in such a way as to avoid short circuiting. In this case, the air, as it separates from the water coming out of the air lift pump, fills the upper portion above the fixed perforated plates and is evacuated through two pipes installed vertically through the perforated plates as far away as possible from the inlet end of the unit. These pipes may also act as overflows if the perforations of the plates would clog and the water would rise to the lip of these pipes.

For this type of invention, solids separation will be done using a static and a dynamic clarifier with or without continuous sludge removal such as in a septic tank equipped with all the accessories such as baffles, walls, etc. required to provide uniform distribution to favor laminar water flow needed for good solids settling and to prevent resuspension.

BRIEF DESCRIPTION OF THE DRAWINGS

The present invention will be better understood with reference to the following drawings in which.

DESCRIPTION OF THE DRAWINGS

Figure 1:
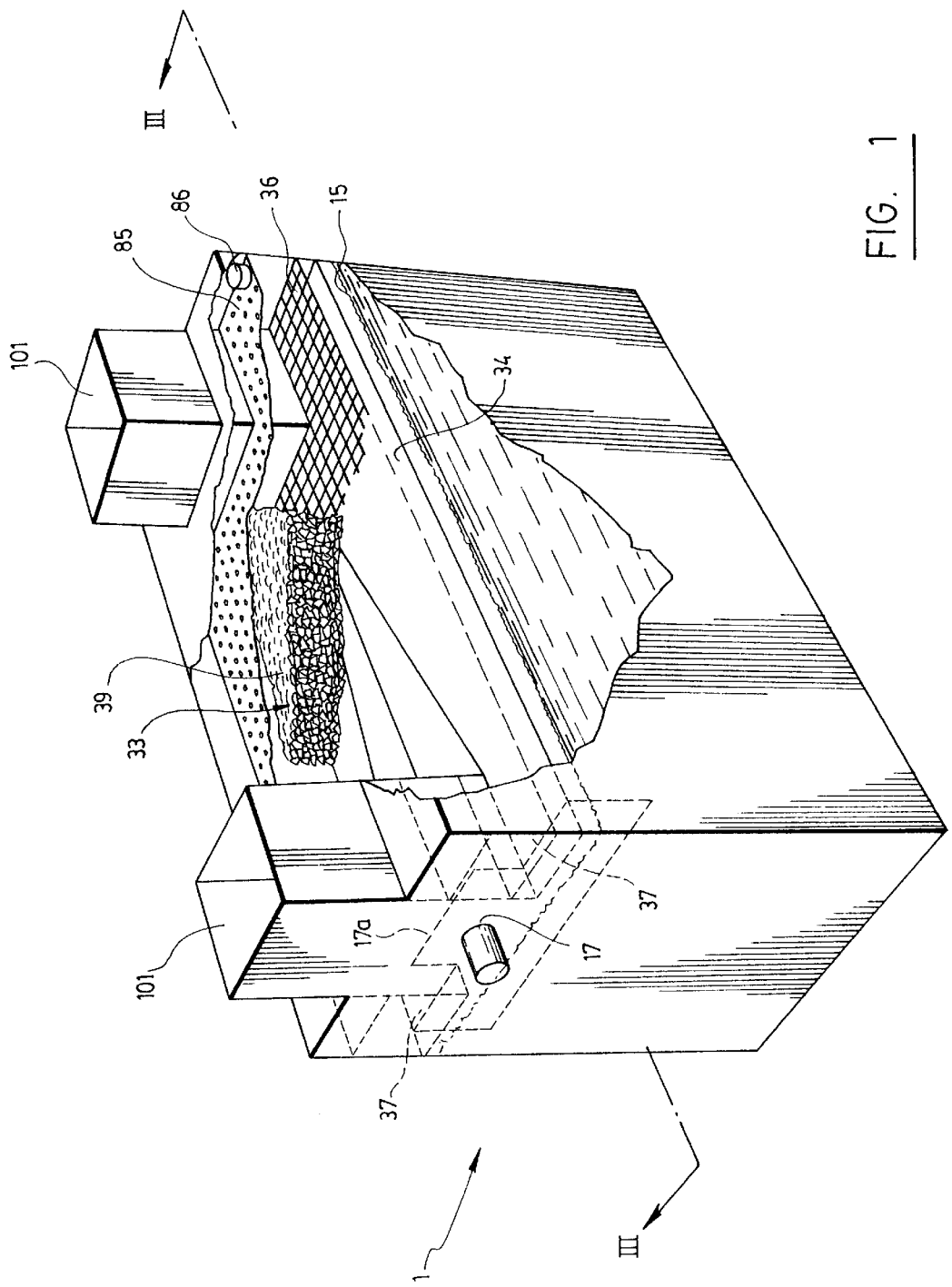
FIG. 1 is a perspective open view of an upper portion of a particularly preferred wastewater treatment unit according to the invention.
Figure 2:
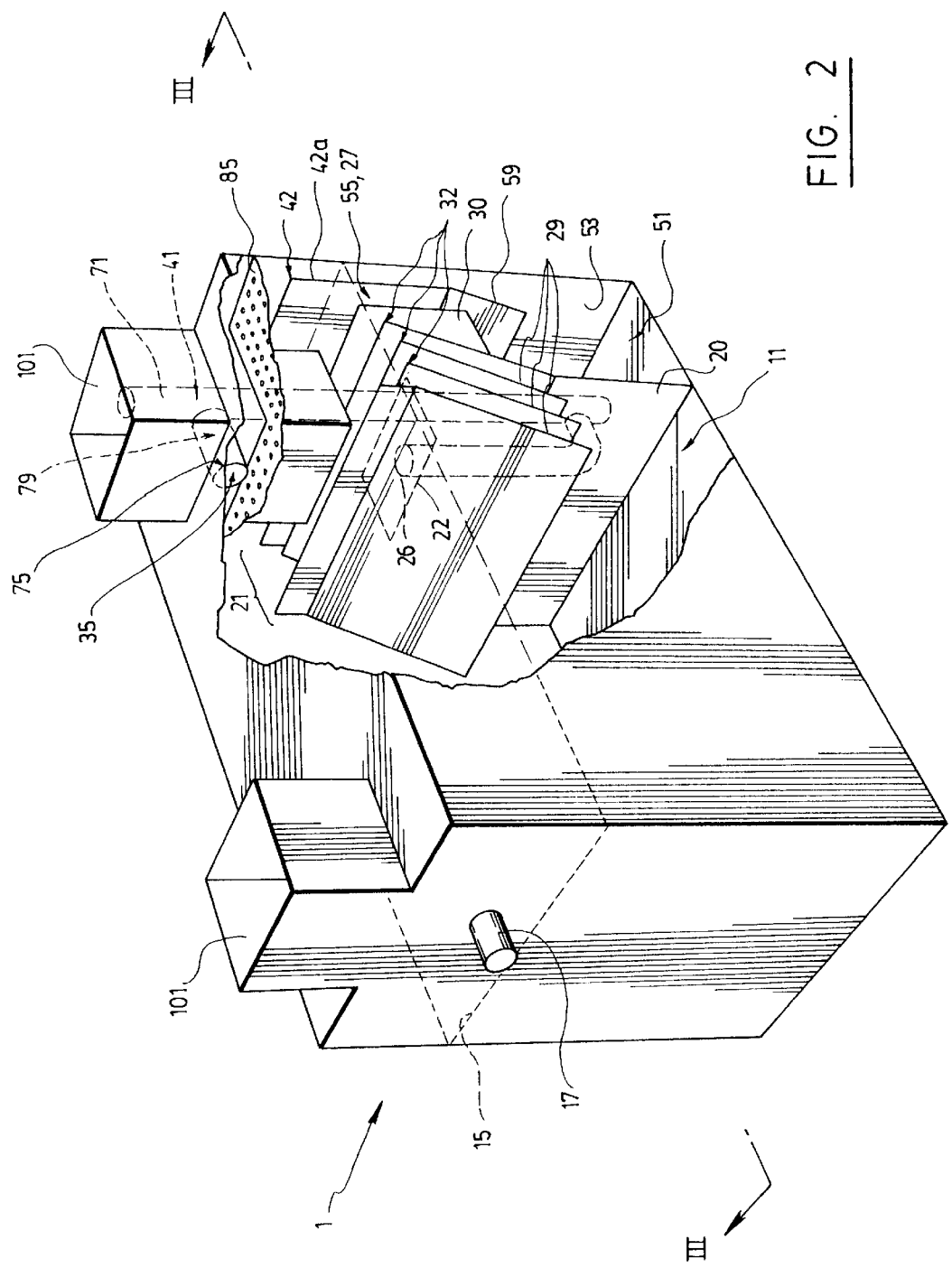
FIG. 2 is a perspective open view of a lower portion of a particularly preferred wastewater treatment unit according to the invention.
Figure 3:
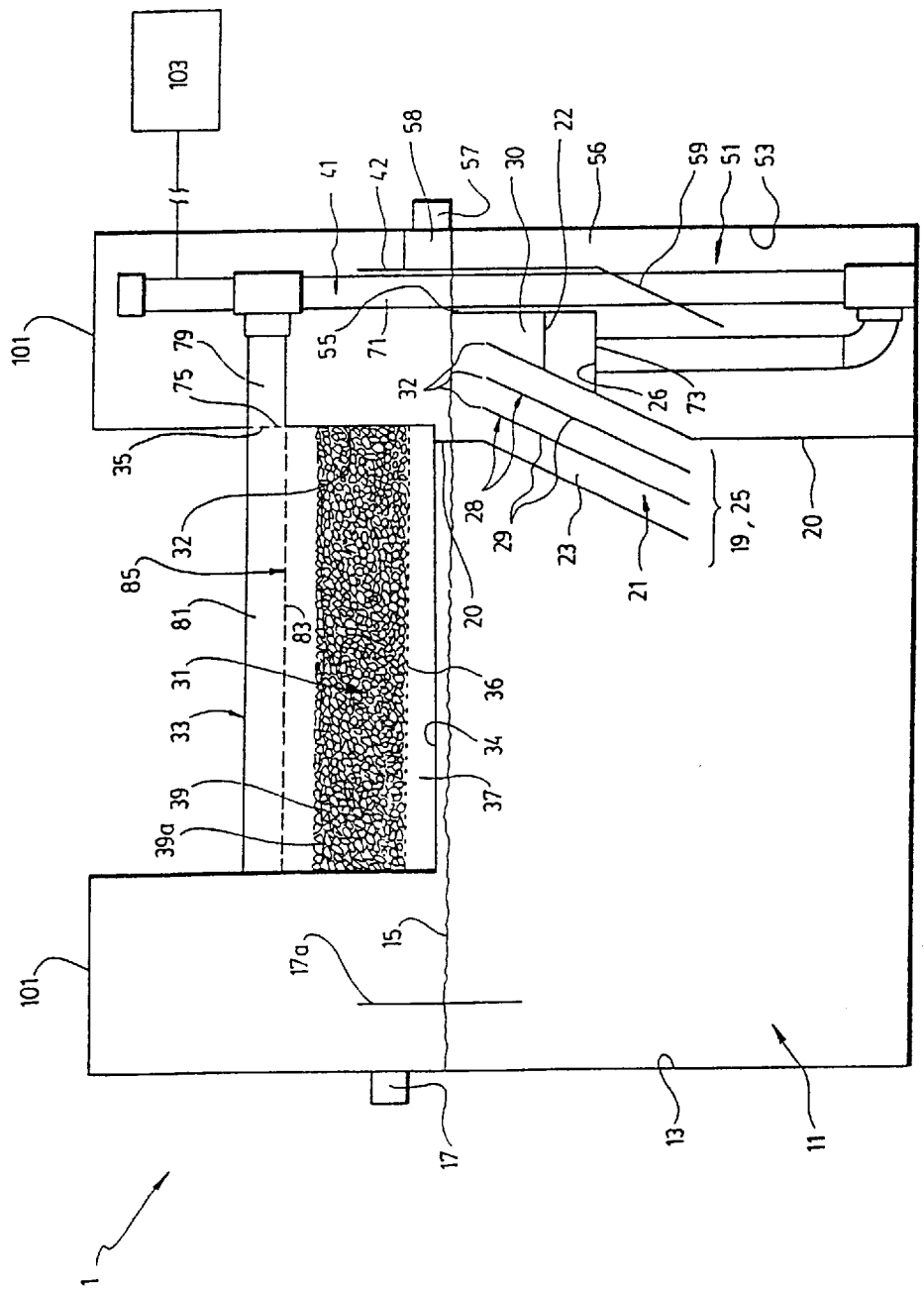
FIG. 3 is a longitudinal cross-sectional view, along line III—III of the preferred wastewater treatment unit illustrated in FIGS. 1 and 2.

As illustrated in FIGS. 1 to 3, the invention relates to a wastewater treatment unit (1), which is operable under high intermittent flow rate variations. The wastewater treatment unit (1) comprises a first clarifier (11) comprising a first reservoir (13) to be filled with wastewater up to a filling level (15) and in which is carried out a gravitational settling of solids and/or heavy portions of the wastewater. This first reservoir (13) has an inlet (17) and an outlet (19). The inlet (17) defines the inlet of the unit. The outlet (19) is positioned under the filling level (15). Preferably, the inlet of the unit (17) is above the filling level (15) of the first reservoir (13).

The wastewater treatment unit (1) comprises a second clarifier (21) comprising a second reservoir (23) having an inlet (25), a first outlet (26) and a second outlet (27). The second clarifier (21) includes a first portion comprising a network (28) of parallel plates (29) inclined with respect to the vertical and a second portion defining a collecting pit (30). Each plate (29) has an upper edge (32) positioned at a height lower than the filling level (15) of the first reservoir (13) to define an overflow giving access to the collecting pit (30). The network (28) of plates (29) allows to carry out a further settling of solids and/or heavy portions of wastewater when this latter flows therethrough, to create a counterflow of settled matter toward the first reservoir (13) and a flow of wastewater falling in the collecting pit (30). The inlet (25) of the second reservoir (23) is in fluid communication with the outlet (19) of the first reservoir (13). Advantageously, as illustrated, the inlet (25) of the second reservoir (23) may be the outlet (19) of the first reservoir (13). The first outlet (26) of the second reservoir (23) is positioned in a lower portion of the collecting pit (30) preferably underneath a baffle (22) centered on the first outlet (26) to prevent short-circuiting of the incoming water, and the second outlet (27) is positioned at the filling level (15). Preferably, the second outlet (27) consists of an overflow lip positioned at the filling level (15).

Filtering means (31) are positioned above the filling level (15) of the first reservoir (13). The filtering means (31) comprises a third reservoir (33) having an inlet (35), an outlet (37) and a filtering media (39) covered by a biomass (39a) for digesting an organic content of the wastewater without substantially retaining suspended solids and/or heavy portions of the wastewater coming from the second clarifier (21). The inlet (35) of the third reservoir (33) is in fluid communication with the outlet (26) of the second reservoir (23), and the outlet (37) is in fluid communication with the inlet (17) of the first reservoir (13).

Referring to FIGS. 1 and 3, the third reservoir (33) has a bottom (34) and is provided with a grid (36) positioned above the bottom (34). The grid (36) may be positioned at a height higher than the outlet (57) of the unit (1). It has to be noted that the bottom (34) and the grid (36) of the third reservoir (33) are not shown in FIG. 2. The filtering media (39) may comprise a stack of modules, inert particles or elements, for example crushed stones, on which is fixed a biomass acclimated to digest organic matter contained in wastewater. The particles are supported on the grid (36). The bottom (34) may be slightly inclined with respect to the horizontal and is provided with at least one downstream outlet defined by the outlet (37) of the third reservoir (33). Advantageously, the biomass is a sludge of microorganisms adhering to medium material such as crushed stones (diameter: 75–100 mm). Such a sludge may be obtained according to techniques well known in the art, for example by the growth of the microorganisms present in the wastewater. The invention does not reside in the sludge itself. This sludge contain microorganisms that will digest organic matter of the wastewater. This wastewater also contains the dissolved oxygen required by the microorganisms to oxidize the organic matter.

Conveying means (41) for conveying the wastewater coming from the first outlet (26) of the second reservoir (23) to the inlet (35) of the third reservoir (33) are provided with the treatment unit (1). Advantageously, as shown in FIG. 3, the conveying means (41) may comprise an air lift pump system (71) having an inlet (73) and an outlet (75). The inlet (73) is in fluid communication with the outlet (26) of the second reservoir (23) underneath the baffle (22). The outlet (75) of the air lift pump system (71) is in fluid communication with the inlet (35) of a distribution device (81) through a horizontal discharge pipe (79) which is part of the air lift pump (71) and serves as an air-water separator. Preferably, as shown in FIGS. 2 and 3, the inlet of the distribution device (81) corresponds to the inlet (35) of the third reservoir (33) and the distribution device (81) may comprise plates (85) or a grid of pipes (not shown) having a plurality of openings (83) oriented above and toward the filtering media (39). The conveying means (41) may further define the means for introducing an oxygen containing gas (e.g. air) in the wastewater coming from the second reservoir (23) and before the filtering media (39).

The wastewater treatment unit also includes a third clarifier (51) comprising a fourth reservoir (53) in which is carried out a further gravitational settling of solids and/or heavy portions still contained in the wastewater and coming from the second reservoir (23). This fourth reservoir (53) has an inlet (55), an outflow controller (58) and an outlet (57). The inlet (55) is in fluid communication with the second outlet (27) of the second reservoir (21). The outlet (57) of the third clarifier (51) defines the outlet of the unit (1) and is positioned to have a lower portion thereof at the filling level (15).

Preferably, the fourth reservoir (53) includes a baffle (42) in fluid communication with the outlet (57) of the fourth reservoir and positioned at a height higher than the filling level (15) and not higher than the inlet (17) of the unit (1).

The baffle includes a plate (59) inclined with respect to the vertical and defining a channel (56) becoming narrower toward the outlet (57) of the fourth reservoir (53).

The outflow controller (58) regulates the water velocity through all the clarifiers. Advantageously, this controller may comprise a restriction dimensioned in accordance with the inlet flow variation and the level variation that we want to accept in the unit. Even though this restriction is located at the outlet end of the unit (57) where substantially no solids should be present, it is advisable not to go lower than a certain diameter to avoid clogging. Overflowing bypasses may be also provided on both sides of the control opening to limit the maximum water rise in the unit.

Figure 4:
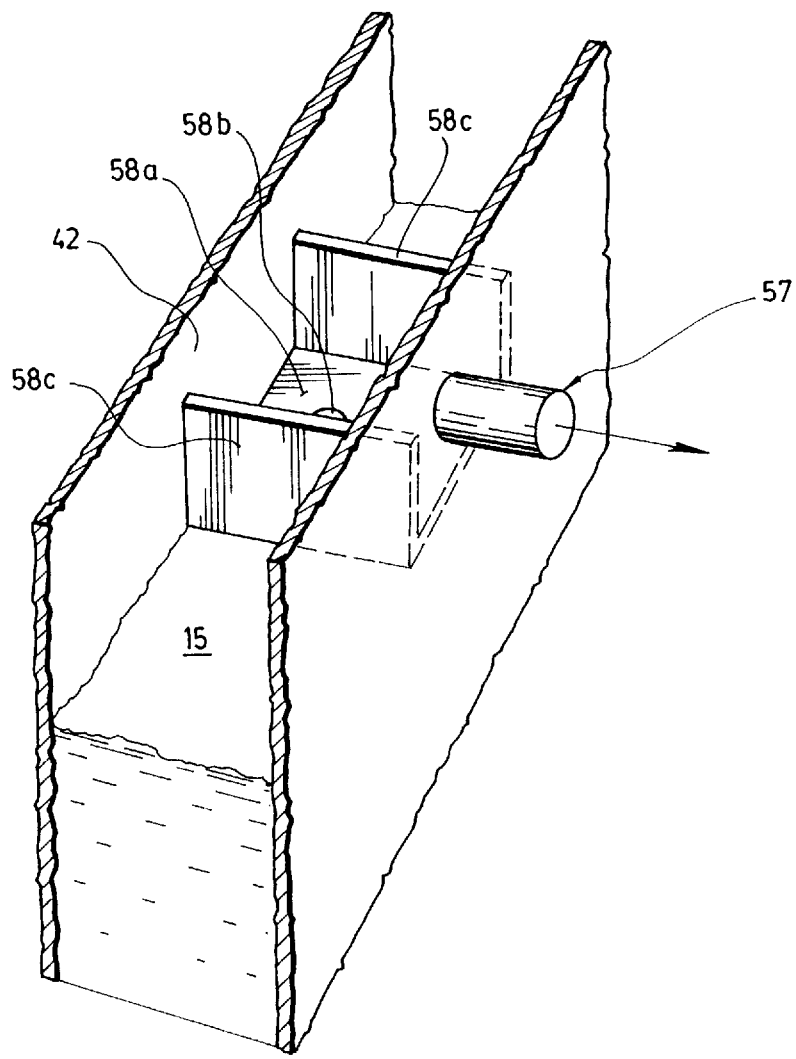
FIG. 4 is an enlarged view of the outflow controller shown in FIG. 3.

Referring to FIGS. 1 and 4, a preferred version of an outflow controller consisting of a restriction is illustrated. The restriction preferably comprises a plate (58a) mounted transversely in a portion of the fourth reservoir (53) below the outlet (57) of the unit. The plate (58a) is provided with a controlling orifice (58b) having a smaller diameter than the diameter of the inlet (17) of the unit. Two spill walls (58c) are extending upwardly from the plate (58a) on each side of the controlling orifice (58b) for allowing an overflow of water in the fourth reservoir (53) to bypass the controlling orifice (58b). For example, the time for discharging the treated wastewater through the outlet (57) of the unit (1) may represent a period up to five times longer than the inlet time to the unit when the maximum is discharged (ex.: bath). The control of the flow of wastewater in the unit (1) is proportional to the square root of the height of water above the controlling opening (58b) in the unit.

Figure 5:
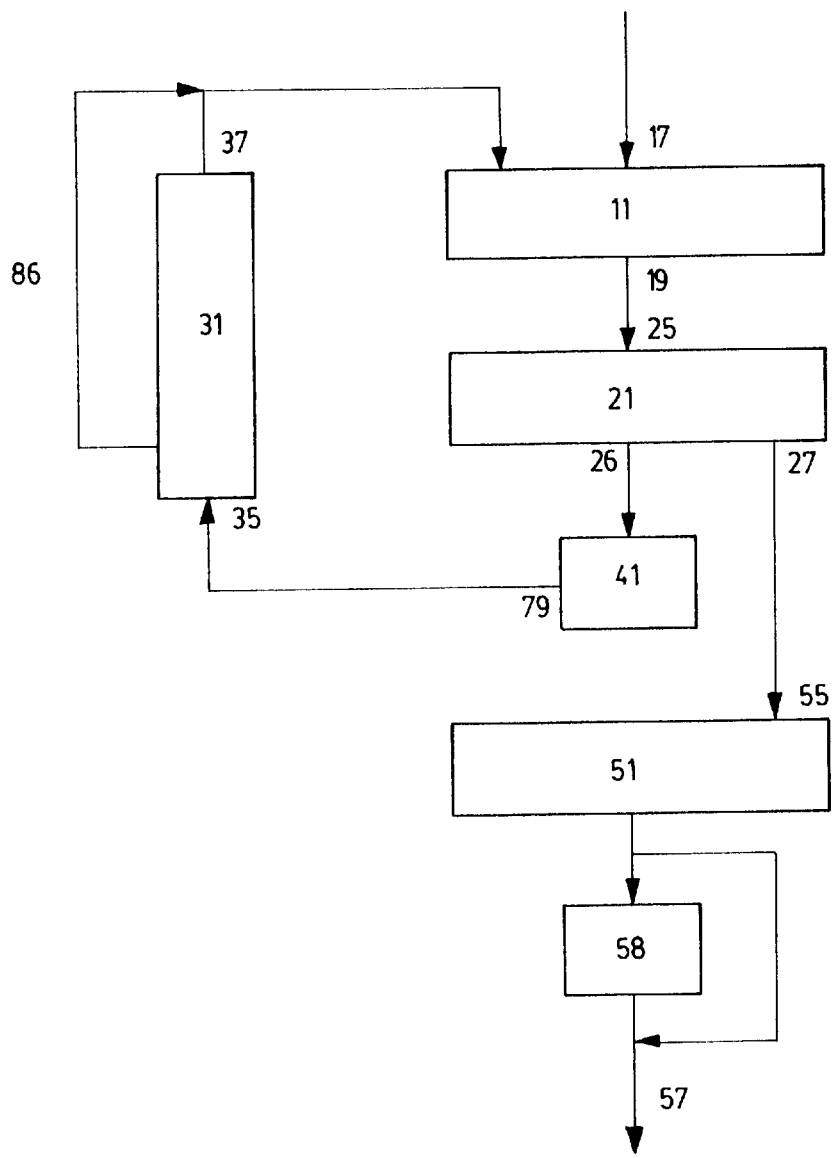
FIG. 5 is a schematic view of a method using a wastewater treatment unit as defined in FIGS. 1 to 3.

The invention also relates, as illustrated in FIG. 5, to a method for treating wastewater with a treatment unit (1) as described hereinbefore. This method is characterized by the following sequence of steps, when the first reservoir (13) and second reservoir (23) are first filled with wastewater above the height of the upper edge (32) of the plates (29) of the second clarifier (21).

Wastewater is introduced in the first reservoir (13) of the first clarifier (11) through the inlet (17) and subjected to a gravitational settling of solids and/or heavy portions of the wastewater.

Wastewater is moved in the second reservoir (23) of the second clarifier (21) via the outlet (19) of the first clarifier (11) and the inlet (25) of the second clarifier (21), to generate further settling of solids and/or heavy portions of the wastewater, to create a counterflow of settled matter toward the first reservoir (13) and to create a flow of wastewater falling in the collecting pit (30).

Wastewater contained in the collecting pit (30) is then conveyed toward the filtering means (31) by the conveying means (41) via the first outlet (26) under the horizontal baffle (22) of the second reservoir (23) and the inlet (35) of the third reservoir (33), enriched in an oxygen containing gas (103) (i.e. air) and then passed through the filtering media (39) to contact the biomass and be digested by it while avoiding to substantially retain solids and/or heavy portions of the wastewater, and an effluent flow is drained via the outlet (37) of the third reservoir (33) and recycled to the first reservoir (13) of the first clarifier (11) near the inlet (17) thereof.

It is to be understood that when a portion of the wastewater flowing in the second clarifier (21) rises above the filling level (15), this portion is evacuated toward the fourth reservoir (53) of the third clarifier (51) through the second outlet (27) of the second reservoir (23) and the inlet (55) of the fourth reservoir (53).

Also, when a portion of the wastewater filling the third clarifier (51) rises above the filling level (15), this portion is drained through the outflow controller (58) and the outlet (57) and thereby through the outlet of the wastewater treatment unit (1).

According to a particularly preferred aspect of the invention, the raw wastewater to be treated comes in the unit through the inlet (17) of the first clarifier (11), hits a baffle (17a) for energy dispersion, and enters the first reservoir (13) of the first clarifier (11) where settable solids are falling to the bottom and light particles (e.g. soap, oil, grease, etc.) rise to be caught in an upper section. Preferably, intermediate walls (20), respectively under and above the inlet (25) of the second reservoir (23), act to keep both the floating and settled solids in the first section away from the parallel plates (29) and the second reservoir (23).

Advantageously, a good distribution of the wastewater and of kinetic energy associated with the introduction and prevention of important flow variations, will contribute to facilitate the settlement of suspended solids.

Preferably, the wastewater treatment unit (1) may be fabricated with different types or combinations of materials. Amongst the preferred materials, there are: concrete, steel, plastic, fiberglass, recycled rubber, or any other having the physical and chemical characteristics to resist the effects of elements in the liquid to be treated as well as efforts induced by the installation, climatic conditions, and activities occurring in the immediate vicinity of the unit. Furthermore, various constituents of the unit (1) may be joined together by any appropriate techniques well known in the art.

The first clarifier (11) preferably has a greater capacity than the second clarifier (21), to facilitate the separation between liquids and solids before flowing between the plates (29) of the second clarifier (21). These plates (29) are efficient to remove smaller solids, which could be more difficult to settle in the first clarifier (11). Also, the greater capacity of the first clarifier (11) allows hot oils and/or greases to be cooled to the ambient temperature, to solidify, and to reach the surface at the filling level (15) before reaching the plates (29), thus preventing clogging of the plates (29).

Preferably, the air is vented through at least one vent overflow (86), shown in FIG. 1, and across voids of the filtering media (39) in the direction of the inlet (17) of the unit where it will exit to be exhausted into the atmosphere at the house plumbing vent. The liquid percolating through the filtering media (39) flows through the support grid (36), falls onto an effluent collector defined by the bottom (34) of the third reservoir (33) and flows by gravity behind the eventual inlet baffle (17a) to be mixed with incoming wastewater from the inlet (17). Solids washed out from the filtering media (39) are then mixed with solids coming in through the inlet (17) of the first clarifier (11) favoring a better contact between the microorganisms and the organic matter to be degraded.

Preferably, the air lift pump system (71) may be built with pipes, tees, elbows, etc. having at least 100 mm in diameter to avoid clogging problems. The suction end shall be located at the bottom of the collecting pit (30). Water is raised above the liquid distributing device (81) by air injection at the lower part of the air lift pump system (71) using a diffuser (not shown) inserted from the top in at least one air tube. This system can be handled for maintenance from the top of the unit (1) without having to dismantle the pump (71). The upper end(s) of the tube(s) is(are) connected by other flexible and/or rigid tube(s) to an air blower (103), especially a compressor, located either on top of the unit (1) or at any other more accessible location. The blower (103) shall be chosen on the required flow for both the pumping capacity and the air needed for the process and the pressure should be in accordance with the static and/or dynamic head for each installation.

The use of an air lift pump is well known in the art. Therefore, there is no need to describe in detail how such a pump works. The use of said pump allows to introduce oxygen into the wastewater before being spread on the filtering media (39). This oxygen allows an efficient digestion of organic matter of the wastewater by the biomass.

The air is injected at the lowest part of the longest pipe of the air lift pump system (71), rises with water to the upper part of said pipe and then flows to the distribution device (81) above the filtration media (39). The air is separated from the wastewater and then it is evacuated through at least one vent (86). Advantageously, this vent directs the air through the voids in the media before exhausting it through the unit inlet (17) to the house plumbing vent (single family system) or to the sewer collection network (multi-family system) where it would come out by street manhole covers as well as house vents. This continuous evacuation of air prevents insects from reaching the biomass.

Manhole covers (101) of the wastewater treatment unit (1) according to the invention may be apparent at the surface of the ground, to give access at all time to all constitutive parts of the unit (1). The plates (29) of the second reservoir (23) may be cleaned by a mere manual scraping. Sludges gathering in the bottom of the first clarifier (11) may be removed according to techniques similar to those used to empty septic tanks. The manhole (101) allows to eventually remove the air diffusor for maintenance purposes.

The user of a wastewater treatment unit (1) according to the invention does not need to adjust or check it for years, except for a small compressor connected to the air diffusor. The user only has to visually check the diffusor when removing the sludge from the first clarifier (e.g. 2–4 years). The compressor may be placed at a distance from the unit (e.g. in a small shed, in the basement of a house, etc.).

A wastewater treatment unit according to the invention is a good alternative to septic tanks, especially where it is not possible to install a septic tank because of the nature of the soil, lack of space, etc. Also, a wastewater treatment unit according to the invention may be obtained by modification of an existing septic tank.

A wastewater treatment unit according to the invention may be used for a hamlet (up to 20 houses and/or dwellings, that is about 75 to 100 persons). This may represent from 20 to 25 m$^3$/day.

With respect to flow rate variation control, a wastewater treatment unit according to the invention can stock and control the outlet flow rate as follows.

Very small flows go through without any delay.

Very high flows create a headloss through the orifice (58b) of the outlet flow control device (58), causing the water level to rise behind it. As the water level rises, the flow through the orifice (58b) increases proportionally to the square root of the height of the water. For the worst scenario, which would be the emptying of a bath in a unit designed for a single family, the inlet flow would last approximately 4 minutes while the outlet flow would last about 25 minutes and the water in the unit would rise by about 100 mm (4 in.). If a combination of flows were causing the water to rise higher, it would flow over at least one weir, thus bypassing the flow control device.

All intermediate scenarios would produce intermediate conditions.

EXAMPLE

Figure 6:
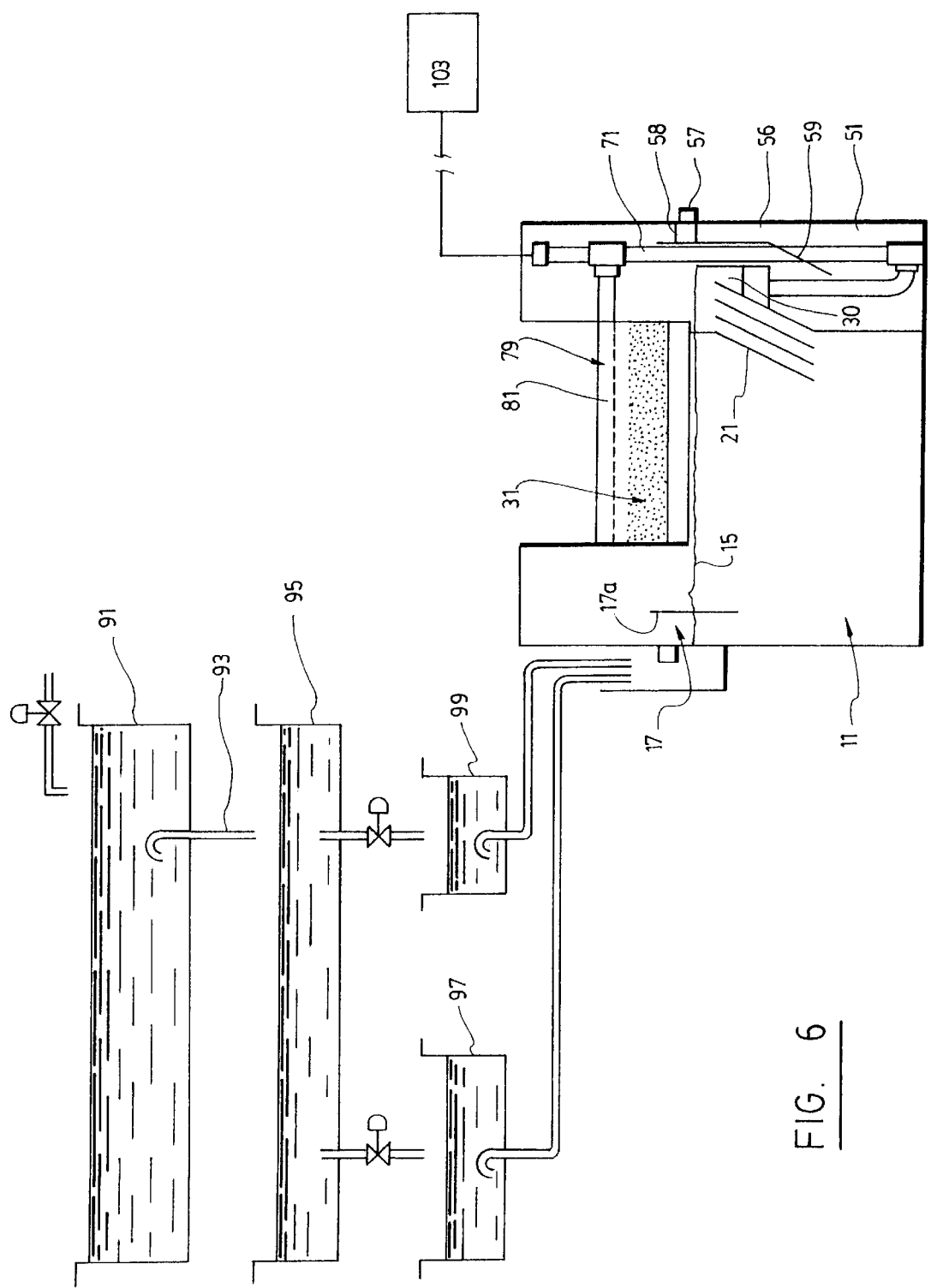
FIG. 6 is a schematic view of an installation used to test a reduced scale prototype of a wastewater treatment unit as illustrated in FIGS. 1 to 3.

Referring to FIG. 6, a schematic view of a prototype used to test the efficiency of a wastewater treatment unit (1) according to the invention is represented.

Initial Hypothesis

The testing unit has been conceived and built with dimensions corresponding to the worst scenario, that is a single family home where 5 persons are living. The average family in North America counts about 3,5 persons. The unitary flow rate considered is of 325 liters per person per day (86 US gal./d). The unit organic loading is 55 grams of $BOD_5$ per person per day.

The most important flow rate is the one corresponding to the emptying of a bath. It is evaluated at an average flow of 2 liters/sec. (32 US gal./min.) over a period of 4 minutes. Modern baths contain about 0.5 m$^3$ of water. For this scenario, however, the mean outlet flow rate will not be higher than 0.55 liter/sec. because of the control provided at the outlet of the unit.

Sizing of the Unit

Various elements of the unit have been sized according to standards established by the WEF handbook, a worldwide recognized American Association gathering specialists in the field of wastewater treatment. This design has been based on a recirculation flow rate of 1.0 liter/sec (15 US gal./min) which is superior than the maximum flow rate that could be induced by the outlet flow rate control device of this invention. The size of the first reservoir (11) (a static clarifier) is such that the superficial load is at most of 24 m$^3$/m$^2$/d (600 US gal./ft$^2$/d). The second clarifier (21) is sized according to 15 m$^3$/m$^2$/hr (365 US gal/ft$^2$/hr), while the third clarifier (51) is designed on 48 m$^3$/m$^2$/d (1200 US gal./ft$^2$/d) without considering, however, the recirculation flow rate because it does not go through the fourth reservoir (53).

The loading rate on the third clarifier (51), is higher because of the polishing role of the latter. The volume of the filtering media (39) supporting the biomass is selected on the unit volume of 36.6 m$^3$/m$^2$/d (900 US gal./ft$^2$/d) for the hydraulic load. This corresponds to a high range of hydraulic load rate. However, the organic load that is of 0.275 kg/d (0.606 lb/d) gives a rate of 0.373 kg/m$^3$/d (23.3 lbs/1000 ft$^3$/d). This value is part of the lower range of load and offers a great security with respect to the efficiency of the treatment.

The testing unit has been built at a ⅕ scale and based on the worst case scenario. Because of the ⅕ scale, the daily solution feed to the unit is of 13 liters, that is 1/125 of the real flow rate (5 persons×325 liters/pers×(⅕)$^3$).

Operation

The water consumption in a dwelling is generally carried out over a period of about 18 hours per day with two peak periods, one in the morning, and the other from about 6:00 PM to 8:00 PM. About 60% of the water consumption is made during the peak flow periods. In order to test the process, tests have been made, the total daily volume being fed in two incidences 12 hours apart. Furthermore, during these peak periods, all of the wastewater has been fed, as if it had come from a toilet or a bath, increasing even more the hydraulic shock load on the unit. The recirculation in the full size unit is about 1 liter/sec (15 US gal./min) independently of the inlet flow rate.

The solution was fed at a constant flow rate in a calibrated reservoir (91) equipped with a siphon (93) initiated when the maximum liquid level is reached. This one is then discharged in a very short time in another reservoir (95) of the same volume serving as a supply to two other reservoirs (97, 99) provided with dosing siphons, said reservoirs (97, 99) being of smaller size and being intended to flow in the inlet (17) of the treatment unit (1). The first reservoir (97) has a volume which simulates the size of a bath while the second reservoir (99) simulates the size of a toilet reservoir. As previously mentioned, the aforesaid tests were carried out under conditions more stringent than in reality, since all water was fed through the siphon units, while in real life, some of it would be discharged at lower rate and at intermittent intervals (ex.: hand washing, dish rinsing, etc.).

Tests have been carried out at ambient temperature. It should be noted that the average temperature of a buried unit may be lower. However, the supply of hot water will contribute to compensate a substantial part of the difference.

The solution recipe used for the test was developed 20 years ago at Purdue University, Indiana. This recipe is designed to simulate a waste having a concentration of approximately 200 mg/l. Based on the hypothesis of 5 persons per house, and 325 liters per person per day, a concentration of 150 mg/l is required for this experiment. For the purpose of this experiment, no dilution has been performed. So the results of the analysis of the treated water are probably a little bit higher than what could be expected for a waste of lower organic content.

Beef extract . . . 500 mg/l

Urea . . . 30 mg/l

Starch . . . 100 mg/l

NaHPO4 . . . 25 mg/l

Tap water was used for the preparation. Therefore, salts commonly used to prepare the aforeseaid solution were omitted, except NaHPO4, which is necessary to ensure life of microorganisms.

Results

| Sampling date | $DBO_5$ inlet (mg/l) | $DBO_5$ sortie (mg/l) |
| --- | --- | --- |
| 17 may 1996 | 192 | 11 |
| 20 may 1996 | 203 | 9 |
| 23 may 1996 | 196 | 16 |
| 26 may 1996 | 200 | 14 |
| 29 may 1996 | 207 | 13 |

The concentration of other parameters such as nitrogen and phosphorus were not analysed, since the amounts in the synthetic affluent is negligible, or completely absent as far as suspended solids are concerned.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A wastewater treatment unit, which is operable under high intermittent flow rate variations and comprising in combination:

a first clarifier comprising a first reservoir to be filled with wastewater up to a filling level and in which is carried out a gravitational settling of solids and/or heavy portions, said first reservoir having an inlet and an outlet, the inlet of the first reservoir defining the inlet of the unit and having a given diameter and the outlet being positioned under the filling level;

a second clarifier comprising a second reservoir having an inlet, a first outlet, a second outlet, a first portion comprising a network of parallel plates inclined with respect to the vertical and a second portion defining a collecting pit, each plate having an upper edge positioned at a height lower than the filling level of the first reservoir to define an overflow giving access to the collecting pit, said network of plates allowing to carry out a further settling of solids and/or heavy portions of wastewater when this latter flows therethrough, to create a counterflow of settled matter toward the first reservoir and to create a flow of clarified wastewater falling in the collecting pit, the inlet of the second reservoir being in fluid communication with the outlet of the first reservoir, the first outlet of the second reservoir being positioned in a lower portion of the collecting pit and the second outlet of said second reservoir being positioned at the filling level;

a filtering means positioned above the filling level of the first reservoir, said filtering means comprising a third reservoir having an inlet, an outlet and a filtering media provided with a biomass for digesting an organic content of the wastewater without substantially retaining suspended solids and/or heavy portions of a wastewater coming from the second clarifier, the inlet of the third reservoir being in fluid communication with the first outlet of the second reservoir, and the outlet of the third reservoir being in fluid communication with the inlet of the first reservoir for recirculation purposes;

means for conveying the wastewater coming from the first outlet of the second reservoir to the inlet of the third reservoir;

a third clarifier comprising a fourth reservoir in which is carried out a further gravitational settling of solids and/or heavy portions still contained in the wastewater coming from the second reservoir, said fourth reservoir having an inlet and an outlet, the inlet being in fluid communication with the second outlet of the second reservoir, the outlet of the third clarifier defining the outlet of the unit and being positioned to have a lower portion thereof at the filling level of the first reservoir;

an outflow controller for controlling an effluent flow of water from the unit through the outlet of the fourth reservoir; and an oxygen containing gas circulating means for circulating an oxygen containing gas through the unit.

2. A wastewater treatment unit according to claim 1, wherein said circulating means comprise means for introducing the oxygen containing gas in the wastewater coming from the second reservoir and before contact with the biomass.

3. A wastewater treatment unit according to claim 2, wherein the outflow controller comprises a restriction at the outlet of the unit.

4. A wastewater treatment unit according to claim 3, wherein the restriction comprises:

a plate mounted transversely in the fourth reservoir below the outlet thereof, the plate being provided with a controlling orifice having a smaller diameter than the diameter of the inlet of the unit; and two spill walls extending upwardly from the plate on each side of the controlling orifice for allowing an overflow of water in the fourth reservoir to bypass the controlling orifice.

5. A wastewater treatment unit according to claim 4, wherein the oxygen containing gas is air.

6. A wastewater treatment unit according to claim 5, wherein the inlet of the second reservoir is the outlet of the first reservoir.

7. A wastewater treatment unit according to claim 6, further comprising a liquid distribution device having an outlet in fluid communication with the inlet of the third reservoir to distribute wastewater from the second clarifier into the filtering media, and wherein the conveying means comprises an air lift pump having an inlet and an outlet, the inlet being in fluid communication with the first outlet of the second reservoir, the outlet of the air lift pump being in fluid communication with an inlet of said distribution device, and said air lift pump defining said means for introducing an oxygen containing gas.

8. A wastewater treatment unit according to claim 7, wherein the distribution device comprises a plate having a plurality of openings oriented above and toward the filtering media.

9. A wastewater treatment unit according to claim 8, wherein the third reservoir has a bottom portion and is provided with a grid positioned above the bottom, wherein the filtering media comprises a stack of modules supported on the grid, and wherein the bottom of the third reservoir is slightly inclined with respect to the horizontal and is provided with at least one downstream outlet defined by the outlet of the third reservoir.

10. A wastewater treatment unit according to claim 9, wherein the inlet of the unit is above the filling level of the first reservoir.

11. A wastewater treatment unit according to claim 10, wherein the fourth reservoir is further provided with a plate inclined with respect to the vertical and defining a channel becoming narrower toward the outlet of said fourth reservoir.

12. A method for treating wastewater in a wastewater treatment unit under high intermittent flow rate variations and comprising the steps of:

filling a first clarifier comprising a first reservoir with wastewater containing solids and/or heavy portions up to a filling level and carrying out a gravitational settling of said solids and/or heavy portions, said first reservoir having an inlet and an outlet, the inlet of the first reservoir defining the inlet of the unit, and the outlet being positioned under the filling level;

carrying out a further settling of solids and/or heavy portions in a second clarifier comprising a second reservoir having an inlet, a first outlet, a second outlet, a first portion comprising a network of parallel plates inclined with respect to the vertical and a second portion defining a collecting pit, each plate having an upper edge positioned at a height lower than the filling level of the first reservoir to define an overflow giving access to the collecting pit, said network of plates allowing to carry out the further settling of solids and/or heavy portions of wastewater when this latter flows therethrough, to create a counterflow of settled matter toward the first reservoir and to create a flow of clarified wastewater falling in the collecting pit, the inlet of the second reservoir being in fluid communication with the outlet of the first reservoir, the first outlet of the second reservoir being positioned in a lower portion of the collecting pit and the second outlet of said second reservoir being positioned at the filling level;

filtering the wastewater from the second clarifier in a filtering means positioned above the filling level of the first reservoir, said filtering means comprising a third reservoir having an inlet, an outlet and a filtering media provided with a biomass for digesting an organic content of the wastewater without substantially retaining suspended solids and/or heavy portions of a wastewater coming from the second clarifier, the inlet of the third reservoir being in fluid communication with the first outlet of the second reservoir, and the outlet of the third reservoir being in fluid communication with the inlet of the first reservoir for recirculation purposes;

carrying out a further gravitational settling of solids and/or heavy portions still contained in the wastewater coming from the second reservoir in a third clarifier comprising a fourth reservoir, said fourth reservoir having an inlet and an outlet, the inlet being in fluid communication with the second outlet of the second reservoir, the outlet of the third clarifier defining the outlet of the unit and being positioned to have a lower portion thereof at the filling level of the first reservoir;

controlling an effluent flow of water from the unit through the outlet of the fourth reservoir; and circulating an oxygen containing gas through the unit.

13. A method for treating waste water according to claim 12, wherein the control of the effluent flow from the unit is performed by means of a restriction located at the outlet of the unit and wherein the method comprises an additional step of bypassing said restriction in case of an overflow of water in the fourth reservoir.

* * * * *